(12) United States Patent
Rosenqvist et al.

(10) Patent No.: US 8,699,553 B2
(45) Date of Patent: Apr. 15, 2014

(54) DATA-AIDED SIR ESTIMATION

(75) Inventors: Anders Rosenqvist, Lund (SE);
Douglas A. Cairns, Durham, NC (US);
Andres Reial, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1092 days.

(21) Appl. No.: 12/709,239

(22) Filed: Feb. 19, 2010

(65) Prior Publication Data

US 2011/0206167 A1 Aug. 25, 2011

(51) Int. Cl.
*H04B 17/00* (2006.01)
*H04L 25/08* (2006.01)

(52) U.S. Cl.
USPC .......................................... 375/227; 375/346

(58) Field of Classification Search
USPC ................. 375/346, 130, 286, 340, 341, 227;
455/63.1, 67.13, 226.3
See application file for complete search history.

(56) References Cited

U.S. PATENT DOCUMENTS

| | | | |
|---|---|---|---|
| 5,263,033 A | 11/1993 | Seshadri | |
| 7,324,783 B2 | 1/2008 | Anderson | |
| 2003/0072395 A1 | 4/2003 | Jia et al. | |
| 2007/0070877 A1 | 3/2007 | Sun et al. | |
| 2008/0247329 A1 | 10/2008 | Ancora et al. | |
| 2009/0052584 A1* | 2/2009 | Cairns | 375/340 |
| 2009/0310708 A1 | 12/2009 | Cheng et al. | |
| 2011/0044399 A1* | 2/2011 | Dowling et al. | 375/286 |
| 2011/0305262 A1* | 12/2011 | Medles | 375/147 |

FOREIGN PATENT DOCUMENTS

| | | |
|---|---|---|
| EP | 1895728 A1 | 3/2008 |
| EP | 2088725 A1 | 8/2009 |
| GB | 2356112 A | 5/2001 |
| WO | 2007021952 A2 | 2/2007 |
| WO | 2007027778 A1 | 3/2007 |
| WO | 2007035993 A1 | 4/2007 |

OTHER PUBLICATIONS

Rosenqvist, A. et al. "Channel Estimation." Co-pending U.S. Appl. No. 12/435,539, filed May 5, 2009.

* cited by examiner

*Primary Examiner* — Khai Tran
(74) *Attorney, Agent, or Firm* — Coats and Bennett, P.L.L.C.

(57) ABSTRACT

A signal-to-interference estimate is generated using unknown data symbols in place of or in addition to pilot symbols. Data received over a data channel (traffic channel or control channel) are collected. The data symbols are then used to compute an observation metric based on deviations of the data symbols from a predetermined set of possible data symbols, wherein one of the data symbols and symbol constellation is normalized. A data channel signal-to-interference ratio is then computed based on the observation metric.

18 Claims, 6 Drawing Sheets

DATA-AIDED SIR ESTIMATION

BACKGROUND

The present invention relates generally to estimation of a signal-to-interference ratio in a wireless communication receiver.

In a wireless communication system, the receiver typically calculates the signal-to-interference ratio (SIR) associated with a receive signal and use the calculated SIR to adapt the transmission parameters to current channel conditions. For example, the calculated SIR may be used to control the mobile station transmit power, data transmission rate, and modulation and coding scheme. Additionally, the calculated SIR may be used to generate a channel quality indicator (CQI) for scheduling purposes.

Conventionally, estimates of the SIR are derived from pilot symbols. Pilot symbols are known symbols that are transmitted over the communication channel. One disadvantage of using pilot symbols to estimate the SIR is that there may be too few pilot symbols for reliable SIR estimation. Increasing the number of pilot symbols would provide more reliable SIR estimation. However, increasing the resources used for transmission of pilot symbols would decrease the resources available for transmission of user data and result in lower system throughput. Also, changing the number of pilot symbols transmitted in a communication system may require standard revisions, which are not desirable.

Demodulated data symbols may be used as additional pilot symbols to improve reliability of SIR estimation. For example, hard symbol decisions output by a demodulator can be compared with the actual transmitted symbols to generate SIR estimates. Alternatively, soft symbol estimates from a demodulator can be decoded and the decoded data can be used to regenerate an estimate of the transmitted symbols.

There are drawbacks to the use of demodulated data symbols for channel estimation. The use of hard symbol decisions by the demodulator as pilot symbols can cause significant performance problems. It is likely that many of the symbol decisions made of the demodulator in the absence of decoding will be incorrect. As a result, SIR estimation methods based on incorrect symbol decisions will not give an accurate SIR estimate. The use of regenerated data symbols based on the decoder output causes delay in the estimation of the SIR. Additionally, the regeneration of data symbols may require extra hardware and more increased power consumption. These limitations make the regeneration approach costly or infeasible in practice.

SUMMARY

SIR estimation is made more reliable by using unknown data symbols in place of or in addition to pilot symbols to estimate the SIR. The unknown data symbols may comprise user data transmitted on a traffic channel or control data transmitted on a control channel. Data symbols are collected from one or more data channels and normalized. The normalized data symbols are used to compute an observation metric based on deviations of the normalized data symbols from a set of possible data symbols (e.g., symbols in the symbol constellation). The observation metric is then mapped to an estimate of the data SIR based on a known relationship between the observation metric and the data SIR. The data SIR may, if desired, be transformed to a pilot SIR based on a known or calculated power offset between the data channel and the pilot channel.

Some possible observation metrics include interference and/or signal power estimates. The interference and/or signal power estimates may contain bias that needs to be analytically or experimentally estimated and removed. Other possible observation metrics include soft value spread statistics and symbol estimate deviation statistics.

In a first exemplary embodiment, hard symbol decisions based on RAKE-combined symbols are used to compute a noise power estimate. The noise power estimate serves as an observation metric for the calculation of the data SIR.

In a second exemplary embodiment, soft bit values extracted from the RAKE-combined symbols are used to compute the noise power estimate. The noise power estimate serves as an observation metric for the calculation of the data SIR.

In the third exemplary embodiment, RAKE-combined symbols are used to compute an observed data SIR, which includes a known bias or a bias that can be estimated and removed. The observed data SIR estimate serves as an observation metric for the calculation of the actual data SIR.

In a fourth exemplary embodiment, RAKE-combined symbols are used to compute a symbol dispersion count. The symbol dispersion count is used as an observation metric for the calculation of the data SIR.

DETAILED DESCRIPTION

Figure 1:
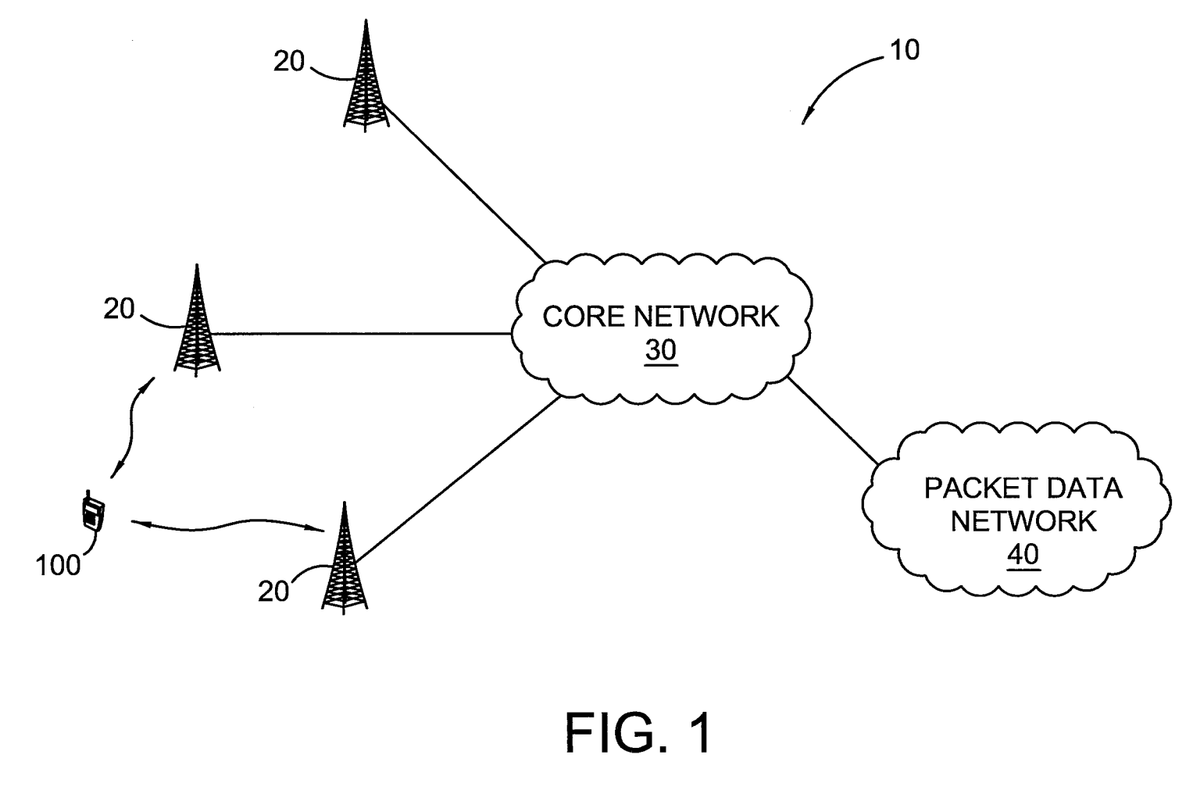
FIG. 1 illustrates an exemplary mobile communication system according to one embodiment of the invention.

FIG. 1 illustrates an exemplary wireless communication network 10 for providing mobile broadband services to one or more user terminals 100. The term user terminal as used herein refers to any portable communication device having the ability to connect wirelessly to a communication network 10. The term user terminal 100 includes, without limitation, cellular phones, smart phones, personal digital assistants, laptop computers, and handheld computers. Wireless communication network 10 includes a plurality of base stations 20 that provide radio coverage within respective cells of the wireless communication network 10 and access to a core network 30. The core network 30, in turn, connects to one or more external packet data networks 40, such as the Internet, and is responsible for routing data between the external packet data networks 40 and the base stations 20 serving the user terminals 100.

Conventionally, the base stations 20 in each cell of the mobile communication network 10 transmit a pilot signal, which enables the user terminals 100 to estimate the channel and to generate an estimate of the signal-to-interference ratio (SIR). For purposes of this application, the term interference includes noise as well as interference from other transmitted signals. Thus, the term signal-to-interference ratio (SIR) should be understood to encompass the more specific term signal-to-interference plus noise ratio (SINR). The SIR is used in the mobile communication network 10 to adapt transmissions to the user terminal 100 to varying channel conditions and interference conditions. For example, the SIR may be used to control the transmit power of the user terminal 100, to determine a data transmission rate for transmissions to the user terminal 100, and/or to select a modulation and coding scheme for transmissions to the user terminal 100. Also, the SIR is commonly used by the user terminal 100 to generate a channel quality indicator (CQI) that is reported to the base station 20 and used to schedule user terminals 100 on shared downlink channels.

SIR is typically estimated based on a pilot signal transmitted from the base station 20 to the user terminal 100. As noted above, there are often too few pilot symbols for reliable SIR estimation and the SIR estimates produced by the user terminal 100 tend to be noisy. Consequently, the user terminal 100 may use or report a conservative estimate of the SIR that is lower than the actual SIR in order to ensure that minimum performance requirements (e.g. BER) are met.

According to embodiments of the present invention, SIR estimation is made more reliable by using unknown data symbols in place of or in addition to pilot symbols to estimate the SIR. The unknown data symbols may comprise user data transmitted on a traffic channel intended for the user terminal 100. The unknown data symbols may, in some embodiments, comprise data symbols transmitted over a traffic channel that are intended for other user terminals 100. The unknown data symbols may also comprise control data symbols transmitted to one or more user terminals 100 over a control channel. As an example, an embodiment of the present invention will be described in the context of a Wideband Code Division Multiple Access (WCDMA) system. Those skilled in the art will recognize that the principles described herein can be applied to mobile communication networks based on other standards, e.g., the WIMAX (IEEE 802.16) standard, and the 3GPP standard known as Long Term Evolution (LTE).

Figure 2:
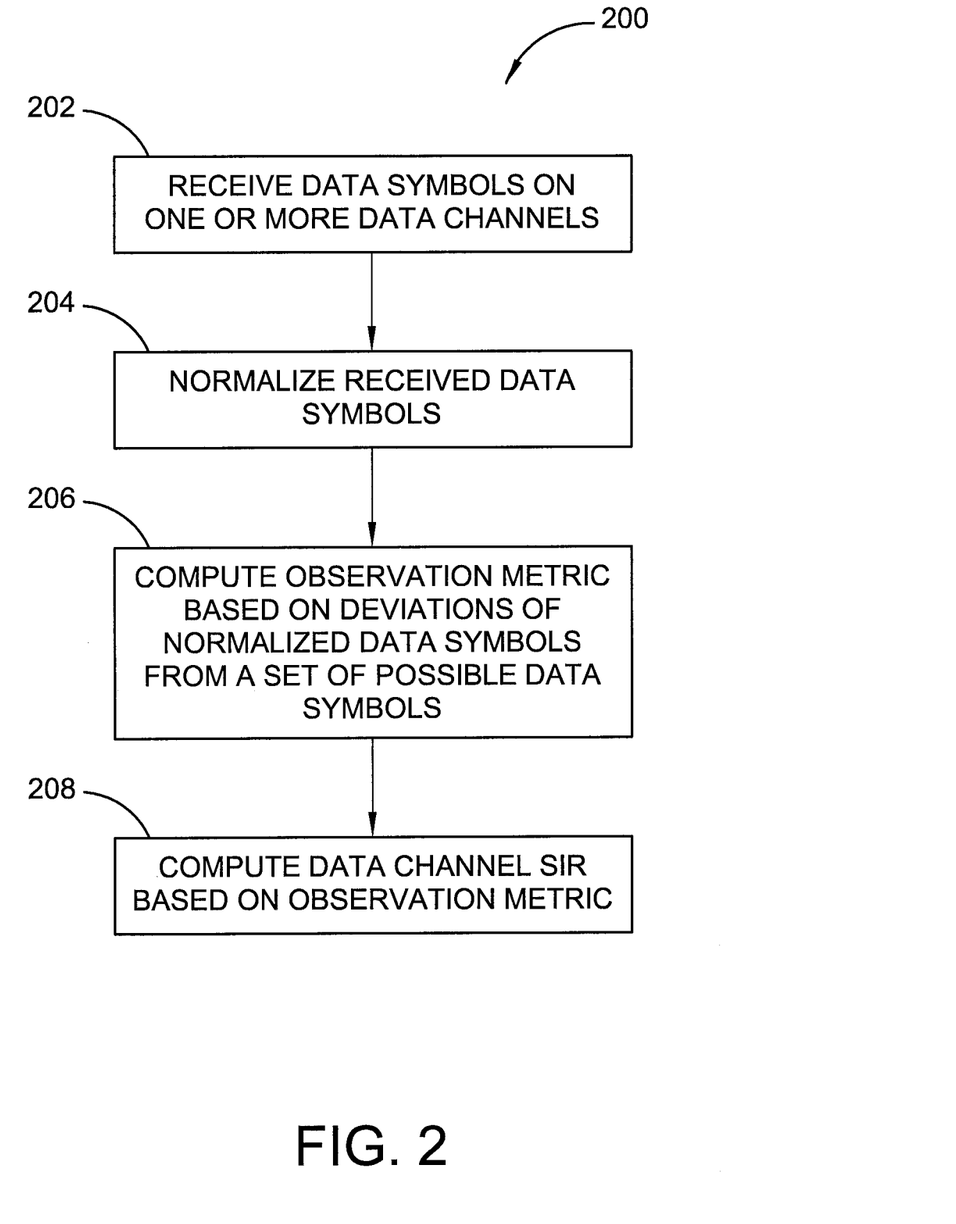
FIG. 2 illustrates an exemplary method of computing data channel signal-to-interference ratio according to one embodiment of the invention.

FIG. 2 illustrates an exemplary method 200 according to one embodiment for generating SIR estimates. The user terminal 100 collects data symbols transmitted on one or more data channels (block 202). As previously noted, the data symbols may comprise user data transmitted to the user terminal 100 on a traffic channel, data symbols transmitted to some other user on a traffic channel, or control data transmitted to the user terminal 100 or a group of user terminals 100 on a control channel. The selected data channel should have a sufficient number of symbols to achieve a desired reliability for the SIR estimate. Further, the selected data channel should preferably have a known power offset to the pilot channel (or other channel whose SIR is being estimated), or a good estimate thereof. If necessary, data symbols may be collected from more than one data channel.

In one exemplary embodiment, a RAKE receiver or generalized RAKE receiver may be used to combine data symbols received over different paths of a multipath channel to generate RAKE-combined symbols for SIR estimation. In some embodiments, the combined symbols may be decomposed into I and Q components and the SIR estimation may be performed in both dimensions. In other embodiments, soft bit values derived from the combined symbols may be used for SIR estimation.

The combined symbols output by the RAKE receiver will, in general, not correspond to integer-valued constellation points on the symbol constellation. Thus, the RAKE-combined symbols, or the soft bits derived from the RAKE-combined symbols, may be scaled in order to reconcile them with integer-valued constellation points. This scaling is analogous to the decision boundary scaling operation in the soft value extraction process. Therefore, some kind of decision boundary estimate will be needed. The decision boundary estimate is an estimated scaling parameter that is related to the actual constellation point power. If soft bit values are used for SIR estimation, the SIR estimation may be incorporated into the process of generating the soft bit values. In any case, the scaling parameters should not exhibit any significant bias. Therefore, any known biases should be estimated and removed prior to scaling.

Referring back to FIG. 2, the data symbols collected on the data channel are normalized (block 204) and the normalized data symbols are used to compute an observation metric based on deviations of the normalized data symbols from a set of possible data symbols (e.g., symbols in the symbol constellation) (block 206). In some instances, direct measure of symbol SIR will not be available. Therefore, other observable metrics that have a deterministic relationship to the actual SIR value for the desired channel may be used for SIR estimation. The relationship between the observation metric and the desired SIR may be determined in advance using empirical data.

Some possible observation metrics include interference and/or signal power estimates. The interference and/or signal power estimates may contain bias that needs to be analytically or experimentally estimated and removed. Other possible observation metrics include soft value spread statistics and symbol estimate deviation statistics.

Because there may be a need for accelerator hardware in order to process a large number of data symbols, the hardware of the receiver may affect which metrics are suitable for SIR estimation. In the absence of hardware limitations, a metric that has the best performance, e.g., least estimation variance, in a region around the current SIR may be used. Thus, different observation metrics may be used as channel conditions vary. In some cases, there may be only one observation metric available. In such case, the observation metric should have a large SIR range.

In some embodiments, optional bias compensation/bias validation may be performed. The reason for bias compensation/validation is that estimation of the decision boundary may have a bias that depends on the actual SIR of the data channel. This bias may affect the observation metric. It is possible to derive analytical expressions for these two types of biases. The expressions may be used for checking possible bias in the observation metric. If the possible bias is acceptable, bias compensation may be omitted. If the possible bias is not acceptable, the observation metric may be corrected by subtracting the bias. Alternatively, new observation metrics could be used based on a different decision boundary estimate.

Once the observation metric is obtained, the user terminal 100 uses the observation metric to compute the actual data SIR, i.e., the estimated SIR of the data channel. A mapping function can be used to map the observation metric to a corresponding data SIR based on the known relationship between the observation metric and the data SIR. The mapping function may be pre-computed and stored as a table in memory. The mapping table may be generated based on empirical performance data. For most purposes, the relevant SIR for normal operation is the pilot SIR, which will be different than the data SIR. To obtain the pilot SIR, an appropriate power offset may be applied to the data SIR. The power offset may be known, or may be estimated using known estimation techniques (block 208).

With this overview behind, a few exemplary embodiments will now be described to illustrate the application of the present invention in a code division multiple access (CDMA) system where received symbols are despread and combined by a RAKE receiver. The term RAKE receiver as used herein refers to a receiver architecture wherein the received signal is despread by RAKE fingers and the RAKE finger outputs are combined to generate received symbol estimates. The term RAKE receiver as used herein should be understood to include the more specific term generalized RAKE (GRAKE) receiver. The vector of despread symbols x(k) output from each RAKE finger is modeled as:

$$x^c(k) = hs(k) + u(k), \quad \text{Eq. 1}$$

where c is a code channel identifier, s(k) denotes the transmitted symbol, h is a vector of net channel coefficients scaled according to the code channel power, and u(k) is a vector of zero mean Gaussian noise samples with covariance matrix $R_u$. The net channel coefficients may be computed from the pilot symbols transmitted on the pilot channel according to:

$$\hat{h}_{pilot} = \frac{1}{N_{pilot}} \sum_{i=0}^{N_{pilot}-1} x_{pilot}(k) s^*(k). \quad \text{Eq. 2}$$

The RAKE receiver combines the received symbols $x^c(k)$ to generate a RAKE-combined symbol according to:

$$z^c(k) = w^H x^c(k), \quad \text{Eq. 3}$$

where w is a vector of combining weights computed from the net channel coefficients h. The combining weights w may be computed by w=h for a RAKE receiver using maximum ratio combining (MRC) and by $w = R_u^{-1} h$ for a GRAKE receiver using interference rejection combining (IRC).

In the case of an MRC receiver, given estimates of $h_{pilot}$ and $R_u$, the pilot SIR for a RAKE receiver can be computed according to:

$$SIR = \frac{|w^H h_{pilot}|^2}{w^H R_u w}. \quad \text{Eq. 4}$$

In the case of an IRC receiver, the SIR calculation simplifies to:

$$SIR = w^H h_{pilot}. \quad \text{Eq. 5}$$

The SIR estimates computed according to Eq. 4 or Eq. 5 can be further smoothed over time to improve the quality of the SIR estimate.

Another alternative for SIR estimation uses the mean and variance of the combined pilot symbols. In this case, the SIR estimate is given by:

$$SIR = \frac{\bar{z}\bar{z}^* - \sigma_{pilot}^2 / N_p}{\sigma_{pilot}^2}, \quad \text{Eq. 6}$$

where $\bar{z}$ is the mean of the pilot symbols and $\sigma_{pilot}^2$ is the variance. The mean $\bar{z}$ of the pilot symbols can be computed according to:

$$\bar{z} = \frac{1}{N_p} \sum_{i=0}^{N_p-1} z_{pilot}(i). \quad \text{Eq. 7}$$

The variance $\sigma_{pilot}^2$ of the pilot symbols can be computed according to:

$$\sigma_{pilot}^2 = \frac{1}{N_p - 1} \sum_{i=0}^{N_p-1} (z_{pilot}(i) - \bar{z})(z_{pilot}(i) - \bar{z})^*. \quad \text{Eq. 8}$$

The direct estimation of the SIR based solely on the pilot symbols may not be accurate due to there being too few pilot symbols. Accordingly, the present invention provides a method of computing a SIR estimate based on unknown data symbols transmitted on a data channel (e.g., traffic channel or control channel). Four exemplary embodiments are described below. In the first embodiment, hard symbol decisions based on RAKE-combined symbols are used to compute a noise power estimate. The noise power estimate serves as an observation metric for the calculation of the data SIR. In the second embodiment, soft bit values extracted from the RAKE-combined symbols are used to compute the noise power estimate. In the third embodiment, the RAKE-combined symbols are used to compute an observed data SIR, which includes a known bias or a bias that can be estimated and removed. The observed data SIR estimate serves as an observation metric for the calculation of the actual data SIR. In the fourth embodiment, a symbol dispersion count is used as an observation metric for the calculation of the data SIR. In all four embodiments, the data SIR can be transformed to a pilot SIR based on a known or estimated power offset.

SIR Estimation Based on Noise Power Estimate Derived from Hard Symbol Decisions

A first embodiment of the invention uses a noise power estimate as the observation metric to compute the actual data SIR estimate. The noise power estimate is computed from hard symbol decisions based on the RAKE-combined symbols output by the RAKE receiver. The RAKE-combined symbols are computed according to:

$$z_{data}^c(k) = w^H x_{data}^c(k), \quad \text{Eq. 9}$$

where $x_{data}^c(k)$ is a vector of despread data symbols corresponding to code c during symbol period k. The I and Q components of the QAM (QPSK) constellation are then decomposed into PAM (BPSK) elements. If $z_{data}^c$ is a row vector, the 1-D symbols are given by:

$$r_{data}^c = [Re\{z_{data}^c\} Im\{z_{data}^c\}], \quad \text{Eq. 10}$$

which is double the length of $z_{data}^c$. At the same time, the net channel coefficient may be computed from the pilot signal according to Eq. 2.

After the data symbols are collected, the data symbols are scaled to normalize the data symbols with the symbol constellation. A decision boundary scaling factor θ may be computed according to:

$$\theta = \rho \frac{1}{2CK} \sum_{c \in S_c} \sum_{k=0}^{2K-1} |r_{data}^c(k)|, \quad \text{Eq. 11}$$

where C is the number of codes, K is the number of symbols, $S_c$ is the set of data symbols in the signaling constellation, and ρ is a bias correction value. The bias correction value ρ is a function of, e.g., the actual symbol SIR obtained in the previous estimation interval. The decision boundary scaling factor is used to compute a normalization factor A according to:

$$A = \frac{\theta}{M},\qquad\text{EQ. 12}$$

where M is a constellation-dependent coefficient (1 for QPSK, 2 for 16QAM, 4 for 64QAM). The normalized data symbols $\tilde{r}_{data}^c(k)$ are then computed according to:

$$\tilde{r}_{data}^c(k) = \frac{r_{data}^c(k)}{A} \forall c, k. \qquad\text{Eq. 13}$$

As previously described, the normalized data symbols $\tilde{r}_{data}^c(k)$ are used to compute an observation metric. In this example, the observation metric comprise the observed noise power estimate denoted $P_{noise\_observed}$. First, hard symbol decisions are made based on the normalized data symbols by mapping each of the normalized data symbols to the closest point on the symbol constellation. In one exemplary approach, the Euclidean distance between the normalized data symbol and each symbol in the symbol constellation is computed. The Euclidean distance d between the normalized data symbol $\tilde{r}_{data}^c(k)$ and a given constellation symbol ψ is given by:

$$d = \|\tilde{r}_{data}^c(k) - \psi\|. \qquad\text{Eq. 14}$$

The detected symbol $\hat{s}_{data}^c(k)$ is assumed to be the constellation symbol associated with the smallest distance:

$$\hat{s}_{data}^c(k) = \psi^{min}. \qquad\text{Eq. 15}$$

The observed noise power $P_{noise\_observed}$ is computed as the average energy of the difference between the detected symbols and the normalized data symbols, using the p-norm measure given by:

$$P_{noise\_observed} = \frac{1}{2CK} \sum_{c \in S_c} \sum_{k=0}^{2K-1} |\hat{s}_{data}^c(k) - \tilde{r}_{data}^c(k)|^p, \qquad\text{Eq. 16}$$

where p comprises the L1-norm (summing absolute values) or L2-norm (summing squared magnitudes). An inverse mapping function is then used to remove bias and obtain the actual noise power from the initial estimate. The mapping function is given by:

$$P_{noise} = F^{-1}(P_{noise\_observed}). \qquad\text{Eq. 17}$$

Figure 3:
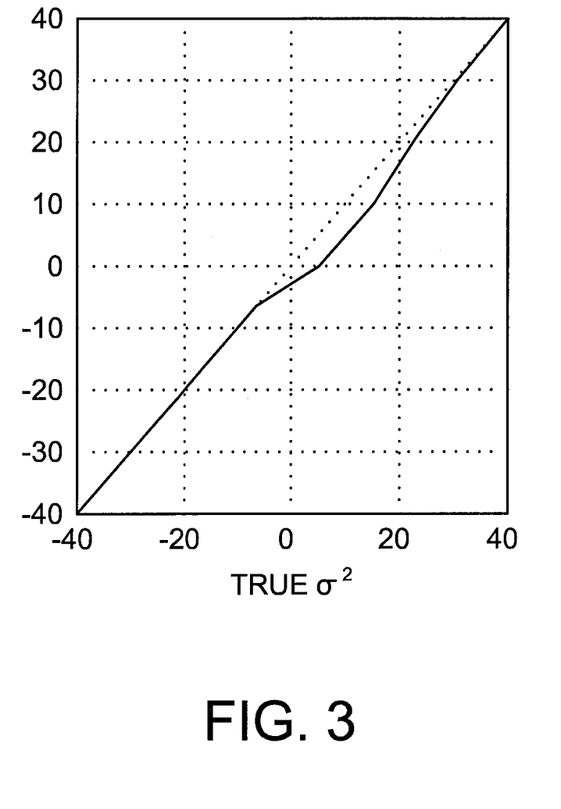
FIG. 3 illustrates a mapping function for mapping an observed noise metric to a true noise metric according to one embodiment.

The inverse mapping function may be based on a previously tabulated function F, which is evaluated using computer simulations. The function F may be defined, for example, by generating a sequence of QAM symbols, adding Gaussian noise with known variance $\sigma^2$, and processing the generated symbols according to Eqs. 11-16, substituting the generated symbol for the RAKE-combined symbol in Eqs. 11 and 13. The resulting initial noise estimates may be used to tabulate the function $P_{noise\_observed} = F(\sigma^2)$, which is dependent on the norm p in Eq. 16. An example mapping function for 16QAM may be seen in FIG. 3. A separate mapping function is stored in memory for each symbol constellation.

The noise power estimate $P_{noise}$ is used as the observation metric to compute the data SIR. The data SIR, denoted $SIR_{data}$, may be computed according to:

$$SIR_{data} = \frac{M_2}{P_{noise}}, \qquad\text{Eq. 18}$$

where $M_2$ represents a constellation-dependent coefficient, e.g., $M_2=1$ for QPSK, $M_2=10$ for 16QAM, and $M_2=42$ for 64QAM. $SIR_{data}$ in turn may be translated to a pilot SIR based on the data to pilot power ratio. The computation of the pilot SIR, denoted $SIR_{pilot}$, is given by:

$$SIR_{pilot} = SIR_{data}\left(\frac{1}{(E_d/E_p)_{est}}\right). \qquad\text{Eq. 19}$$

SIR Estimation Based Noise Power Estimate Derived from Soft Bit Values

A second embodiment of the invention also uses a noise power estimate as the observation metric to compute the data SIR estimate, but calculates the noise power estimate using soft bit values derived from the RAKE-combined symbols. In this embodiment RAKE-combined symbols computed according to Eq. 9, the I and Q components of the QAM (QPSK) constellation are decomposed into PAM (BPSK) elements according to Eq. 10, and normalized data symbols are computed according to 11-13 as previously described. However, instead of generating hard symbol decisions, this embodiment uses the least significant soft bit values (the LSB values for short) in both the I and Q dimensions to compute the noise power estimate. The LSB values can be computed as follows:

$$\lambda^c(k) = \tilde{r}_{data}^c(k) \text{ for QPSK} \qquad\text{Eq. 20}$$

$$\lambda^c(k) = -2 + |\tilde{r}_{data}^c(k)| \text{ for 16QAM} \qquad\text{Eq. 21}$$

$$\lambda^c(k) = -2 + ||\tilde{r}_{data}^c(k)| - 4| \text{ for 64QAM} \qquad\text{Eq. 22}$$

Those skilled in the art will recognize that the particular extraction technique is not material to the invention and that other well-known soft bit extraction techniques could also be used.

The observed noise power, denoted $P_{noise\_observed}$ is computed as the average soft value deviation between the detected symbols and the normalized data symbols, using the p-norm measure given by:

$$P_{noise\_observed} = \frac{1}{CK} \sum_{c \in S_c} \sum_{k=0}^{2K-1} ||\lambda^c(k)| - 1|^p, \qquad\text{Eq. 23}$$

where p comprises the L1-norm (summing absolute values) or L2-norm (summing squared magnitudes). An inverse mapping function is then used to obtain the true noise power from the initial estimate according to Eq. 17 as previously described. However, a different mapping function F, may be used based on the relationship between the observation metric and the actual noise power.

. The observed noise power estimate serves as an observation metric for computing the data SIR. The data SIR can be computed by inverse mapping the observed noise power to an actual noise power according to Eq. 17, and computing the data SIR according to Eq. 18. The data SIR can then be transformed to a pilot SIR according to Eq. 19.

SIR Estimation Based on an Observed SIR

A third embodiment of the invention uses a direct estimate of the observed data SIR as the observation metric. Bias correction is applied to the observed data SIR to obtain the actual data SIR. A RAKE receiver in the user terminal 100 generates RAKE-combined data symbols $z_{data}^c$ according to Eq. 9 and computes a net channel response vector according to Eq. 2.

After the data symbols $z_{data}^c$ are collected, the data symbols $z_{data}^c$ are scaled to normalize the data symbols with the symbol constellation. The user terminal 100 computes or otherwise obtains the data to pilot power ratio $(E_d/E_p)_{est}$. The data to pilot power ratio $(E_d/E_p)_{est}$ can be computed according to any known methods. The normalization factor A is computed from the data to pilot power ratio according to:

$$A = \left(\frac{E_d}{E_p}\right)_{est} |w^H \hat{h}_{pilot}|^2, \qquad \text{Eq. 24}$$

and normalized data symbols $\tilde{z}_{data}^c$ are computed according to:

$$\tilde{z}_{data}^c(k) = \frac{z_{data}^c(k)}{A} \, \forall \, c, k. \qquad \text{Eq. 25}$$

The normalized data symbols $\tilde{z}_{data}^c(k)$ are used to compute the observed data SIR, $SIR_{data\_observed}$, which is used as the observation metric. First, hard symbol decisions are made based on the normalized data symbols $\tilde{z}_{data}^c(k)\tilde{z}_{data}^c$ by mapping each of the normalized data symbols $\tilde{z}_{data}^c(k)$ to the closest point on the symbol constellation. In one exemplary approach, the Euclidean distance between the normalized data symbol $\tilde{z}_{data}^c(k)$ and each symbol in the symbol constellation is computed. The Euclidean distance d between the normalized data symbol $\tilde{z}_{data}^c(k)$ and a given constellation symbol $\psi$ is given by:

$$d = \|\tilde{r}_{data}^c(k) - \psi\|. \qquad \text{Eq. 26}$$

The detected symbol $\hat{s}_{data}^c(k)$ is assumed to be the constellation symbol associated with the smallest distance:

$$\hat{s}_{data}^c(k) = \psi^{min}. \qquad \text{Eq. 27}$$

The hard symbol decisions are used to compute the signal power and noise power, from which the observed SIR, denoted $SIR_{data\_observed}$ can be directly computed. The signal power can be computed as the average energy of the detected symbols according to:

$$\text{signal\_power} = \frac{1}{CK} \sum_{c \in S_c} \sum_{k=0}^{K-1} \hat{s}_{data}^c(k)(\hat{s}_{data}^c(k))^*. \qquad \text{Eq. 28}$$

The noise power can be computed as the average energy of the difference between the detected symbols and the normalized data symbols according to:

$$\text{noise\_power} = \frac{1}{CK} \sum_{c \in S_c} \sum_{k=0}^{K-1} (\hat{s}_{data}^c(k) - \tilde{z}_{data}^c(k))(\hat{s}_{data}^c(k) - \tilde{z}_{data}^c(k))^*. \qquad \text{Eq. 29}$$

The observed data SIR can then be computed by:

$$SIR_{data\_observed} = \frac{\text{signal\_power}}{\text{noise\_power}}. \qquad \text{Eq. 30}$$

A mapping function can be applied to the observed data SIR to correct for modulation dependent bias as the first step in computing the data SIR. More particularly, a bias correction factor $\zeta$ is given by the function:

$$\zeta = f(SIR_{data\_observed}). \qquad \text{Eq. 31}$$

A detailed explanation regarding the calculation of the bias correction factor $\zeta$ is deferred until later. The actual data SIR is then given by:

$$SIR_{data\_actual} = SIR_{data\_observed}(\zeta). \qquad \text{Eq. 32}$$

The actual data SIR in turn may be translated to a pilot SIR based on the data to pilot power ratio according to Eq. 19.

In some embodiments, the data SIR may be recalculated if it exceeds a modulation-dependent threshold. If the modulation-dependent threshold is exceeded, the user terminal 100 may compute a new normalization factor according to:

$$\tilde{A} = \frac{\theta}{\sum_{c \in S_c} \sum_{k=0}^{K-1} (0.5\text{Re}\{\hat{s}_{data}^c(k)\} + 0.5\text{Im}\{\hat{s}_{data}^c(k)\})}, \qquad \text{Eq. 33}$$

where $\theta$ is a scaling factor. The scaling factor $\theta$ can be computed by:

$$\theta = \sum_{c \in S_c} \sum_{k=0}^{K-1} (0.5|\text{Re}\{z_{data}^c(k)\}| + 0.5|\text{Im}\{z_{data}^c(k)\}|). \qquad \text{Eq. 34}$$

The user terminal then rescales the previously normalized data symbols to derive new normalized data symbols, recomputes the noise power, and recomputes the observed SIR. The rescaled normalized data symbols are given by:

$$\bar{z}_{data}^c(k) = \tilde{z}_{data}^c(k)\frac{A}{\tilde{A}} \, \forall \, c, k. \qquad \text{Eq. 35}$$

The new poise power is calculated according to:

$$\text{noise\_power} = \frac{1}{CK} \sum_{c \in S_c} \sum_{k=0}^{K-1} (\hat{s}_{data}^c(k) - \bar{z}_{data}^c(k))(\hat{s}_{data}^c(k) - \bar{z}_{data}^c(k))^*. \qquad \text{Eq. 36}$$

The new data SIR is computed according to Eq. 31 as previously described. No bias correction is need for the new data SIR, which can be translated into a new pilot SIR according to Eq. 19.

There are in principal two general approaches for calculation of the bias compensation factor $\zeta$, referred to herein as the single compensation approach and the multiple compensation approach. Ideally, the bias compensation function (Eq. 31) should model the relationship between the actual data SIR estimate and the observed data SIR estimate. This relationship is not known a priori, but the average relationship can be learned through simulations.

One general approach taken is to simulate the reception of a WCDMA data plus pilot signal through a fading channel.

The simulation should repeat for a range of SIR values, adding AWGN. For each SIR, the procedure described above for SIR estimation should be employed. The actual data SIR is calculated as well (e.g.

$$SIR_{data\_actual} = \frac{|w^H h_{data}|^2}{w^H R_u w},$$

where all quantities are known exactly.

$SIR_{data\_observed}$ and $SIR_{data\_actual}$ are recorded and saved for later processing. After the simulation is complete, a plot of $SIR_{data\_actual}/SIR_{data\_observed}$ versus $SIR_{data\_initial}$ can be constructed. One can then search for the polynomial or that "best" fits the data in a least norm sense. The term polynomial is used here is a general sense, and could mean something of the form $a_n x^n + a_{n-1} x^{n-1} + \ldots + a_0$, or a piecewise linear function, etc. This polynomial is then $f(SIR_{data\_observed})$ referred to in Eq. 31.

We have shown that this approach works quite well, but it has one flaw. The mapping function $f(SIR_{data\_observed})$ depends upon the data and pilot powers used during the simulation that generated the mapping function. The following potential realizations of the compensation function address this shortcoming.

The basic idea behind the single compensation approach is to generate a single reference mapping function based on data and pilot powers that fall within the range of expected values. For example, if the data power is generally expected to be between 1% and 7% of the total transmitted power, the simulation would use a reference data power $E_{d,ref}$ of $(1+7)/2=4\%$. Similarly, if the pilot power is generally expected to be between 7% and 13% of the total transmitted power, then the simulation would use a reference pilot power $(E_{p,ref})$ of $(7+13)/2=10\%$. Given the mapping function generated by a reference simulation with these parameters, the input to the mapping function must be modified according to:

$$\zeta = f\left(SINR_{data\_initial}\left(\left(\frac{E_d}{E_p}\right)_{est} \bigg/ \left(\frac{E_{d,ref}}{E_{p,ref}}\right)\right)\right). \quad \text{Eq. 37}$$

The mapping functions are modulation-specific, so a reference mapping function would have to be created for each form of modulation.

The basic idea behind the multiple compensation approach is to generate multiple mapping functions based on data and pilot powers that fall within the range of expected values. For example, given a range of expected data and pilot powers, mapping functions would be generated for the range of values $(E_d/E_p)_{min}=\min(E_d)/\max(E_p)$ to $(E_d/E_p)_{max}=\max(E_d)/\min(E_p)$. Note that this means a separate simulation for each data to pilot power ratio. It also means that each mapping function is associated with a particular data to pilot power ratio. Let the pair $((E_d/E_p)^i, f^i)$ describe the association between mapping functions and data) to pilot power ratios. Given this description, the Eq. 31 given above should be modified. More particularly the bias factor is computed by determining the value of i such that $$\left|\left(\frac{E_d}{E_p}\right)_{est} - \left(\frac{E_d}{E_p}\right)^i\right| \quad \text{Eq. 38}$$

is minimized. The bias correction factor may then be computed according to:

$$\zeta = f^i(SINR_{data\_initial}). \quad \text{Eq. 39}$$

The bias correction factor computed according to Eq. 39 may be used in Eq. 32 to compute the actual data SIR.

SIR Estimation Based on Symbol Dispersion Counts

Figure 4:
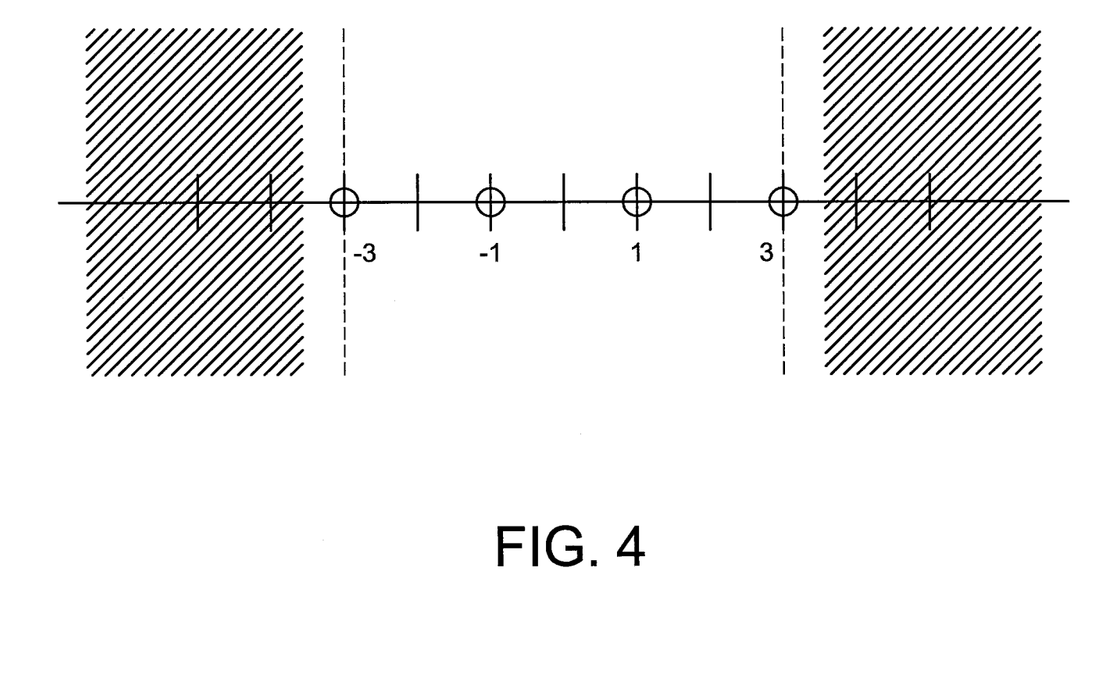
FIG. 4 illustrates dispersion of received data symbols in a PAM constellation.

A fourth embodiment uses symbol dispersion counts as an observation metric from which the actual data SIR is estimated. This embodiment takes advantage of the fact that the probability of received symbols falling outside the envelope of a nominal symbol constellation is related to the actual data SIR. Because lower SIR results in more dispersed symbol clouds around constellation points, the SIR can be determined by counting the number of points that fall some distance outside the envelope of the symbol constellation. FIG. 4 illustrates an exemplary deviation criterion for determining the symbol dispersion count.

In this embodiment RAKE-combined symbols computed according to Eq. 9, the I and Q components of the QAM (QPSK) constellation are decomposed into PAM (BPSK) elements according to Eq. 10, and normalized data symbols are computed according to Eqs. 11-13 as previously described. However, instead of generating hard symbol decisions, this embodiment uses the symbol dispersion counts to compute the noise power estimate. The noise power estimates serve as an observation metric for computing the data SIR.

To compute the noise power estimate, the user terminal 100 counts the fraction of symbols that fall outside the envelope of the symbol constellation. The symbol dispersion count is given by:

$$\delta = \frac{1}{C2K} \sum_{c \in S_c} |L^c|, \quad \text{Eq. 40}$$

where $|L^c|$ is given by $$L^c = \{\tilde{r}_{data}^c(k) : |r_{data}^c(k)| > \psi_{max} + \tau\} \quad \text{Eq. 41}$$

The factor $\tau$ is a threshold that is tuned to optimize performance in the SIR region of interest, and $\psi_{max}$ is the largest 1-D constellation point value.

The data SIR is computed in this embodiment by inverse mapping the observed noise power to the actual noise power according to:

$$P_{noise} = F^{-1}(\delta). \quad \text{Eq. 42}$$

Figure 5:
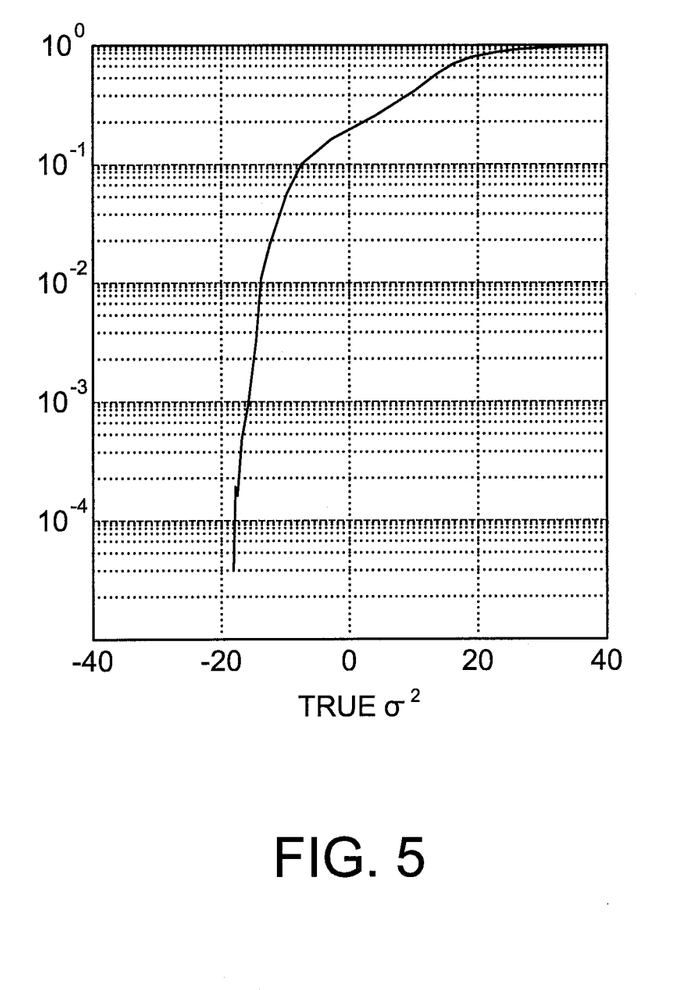
FIG. 5 illustrates a mapping function for mapping an observed noise metric to a true noise metric according to one embodiment

An example of the mapping function is illustrated in FIG. 5. The data SIR is computed based on the actual noise power and can then be transformed to a pilot SIR according to Eq. 18.

The biases in the different estimated parameters (observed SIR, decision boundary scaling, etc.) may be corrected or accounted for according to many different configurations. For example, each bias may be compensated individually, or the accumulated net effect of the different biases may be accounted for in the inverse mapping stage. The p-norm operation in the initial power estimate could be e.g. L1-norm (summing absolute values) or L2-norm (summing squared magnitudes squared).

The metric definition and inverse mapping steps have been illustrated using single-variable metrics. The principle of the invention applies equally to multi-variate metrics where several observable quantities are used to define the mapping to noise variance or SIR.

Figure 6:
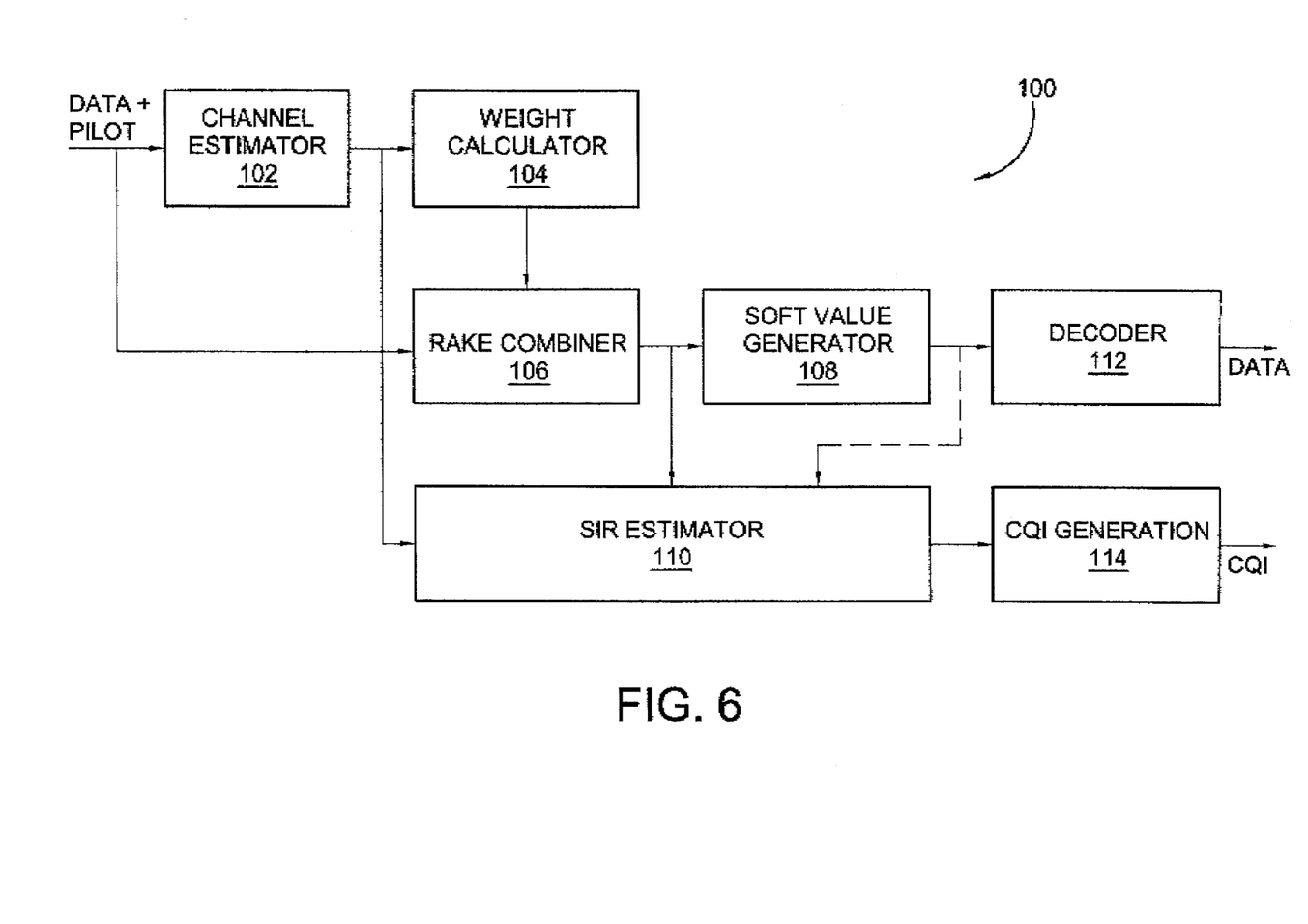
FIG. 6 illustrates an exemplary receiver according to one embodiment of the invention.

FIG. 6 illustrates an exemplary receiver 100 according to one exemplary embodiment of the invention. The receiver 100 comprises a channel estimator 102, weight calculator 104, RAKE combiner 106, soft value generator 108, SIR estimator 110, decoder 112, and CQI generator 114. The channel estimator 102 generates an estimate of the pilot channel according to Eq. 2. The channel estimator 102 may also generate estimates of the data channels. The weight calculator 104 computes combining weights for the RAKE combiner 106. The RAKE combiner 106 despreads and combines the received signal in a known manner using MRC or IRC. The RAKE-combined values output by the RAKE combiner 106 are fed to the soft value generator 108 and SIR estimator 110. The soft value generator 108 generates soft bit values from the RAKE combined symbols which are fed to the decoder 112 for decoding. In some embodiments, the soft bit values may be fed to the SIR estimator 110. The SIR estimator 110 generates an estimate of the data SIR according to any of the methods described above. The SIR estimator 110 may also generate a pilot SIR.

The present invention significantly reduces SIR estimation variance without requiring additional common pilot symbols or regenerated data symbols. The compensation/mapping functions may be tailored to be optimal for different (small) regions of actual SIR, or to be a good compromise for other (larger) regions of actual SIR. The compensation/mapping function approach allows for the use of so-called soft bits instead of hard symbols (hard decoded symbols). These soft bits are generated anyway in most receivers, and the use of such soft bits may reduce the computational load of the invention.

The methods described herein allow for the direct estimation of the SIR of non-linearly processed data sequences, e.g. in SIC or ML-like receivers. This is a difficult task for traditional SIR estimators and usually approached via approximation.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of generating a signal quality estimate, said method comprising:
   receiving unknown data symbols on a data channel;
   computing an observation metric based on deviations of said data symbols from a predetermined set of possible data symbols in a known symbol constellation, wherein one of the data symbols and the symbol constellation are normalized; and
   correcting the observation metric by applying an inverse mapping function to obtain a corrected observation metric;
   estimating a data channel signal-to-interference ratio based on the corrected observation metric.

2. The method of claim 1 wherein computing an observation metric based on deviations of said data symbols from a predetermined set of possible data symbols in a known symbol constellation comprises:
   demodulating the received symbols to generate detected symbols;
   computing normalized data symbols from said received data symbols; and
   computing a noise power estimate as an average energy of the difference between said detected symbols and said normalized data symbols.

3. The method of claim 2 wherein demodulating the received symbols to generate detected symbols comprises determining, for each received symbol, a corresponding symbol in a predetermined symbol constellation that is closest to said received normalized data symbol.

4. The method of claim 2 wherein computing normalized data symbols from said received data symbols comprises:
   computing a decision boundary scaling factor based on said received data symbols;
   computing a normalization factor based on said decision boundary scaling factor; and
   applying said normalization factor to said received data symbols.

5. The method of claim 2 wherein computing normalized data symbols from said received data symbols comprises:
   determining a pilot SIR from received pilot symbols;
   computing a normalization factor based on said pilot SIR and a data-to-pilot power ratio; and
   applying said normalization factor to said received data symbols.

6. The method of claim 1 wherein computing an observation metric based on deviations of said data symbols from a predetermined set of possible data symbols comprises:
   computing normalized data symbols from said received data symbols;
   extracting soft values for one or more least significant bits of said normalized data symbols; and
   computing a noise power estimate as an average soft value deviation from a p-norm measure.

7. The method of claim 1 wherein computing an observation metric based on deviations of said data symbols from a predetermined set of possible data symbols comprises:
   computing normalized data symbols from said received data symbols; and
   computing a count of said normalized data symbols falling outside a symbol constellation envelope.

8. The method of claim 1 further comprising transforming said data channel signal-to-interference ratio to an estimated pilot channel signal-to-interference ratio.

9. The method of claim 8 wherein transforming said data channel signal-to-interference ratio to an estimated pilot channel signal-to-interference ratio comprises determining a data-to-pilot power ratio; and scaling said data channel signal-to-interference ratio according to a said data-to-pilot power ratio.

10. A communication device comprising:
    a receiver for receiving unknown data symbols over a data channel from a base station in a wireless communication network; and
    processing circuits for processing said data symbols, said processing circuit configured to:
       compute an observation metric based on deviations of said data symbols from a predetermined set of possible data symbols in a known symbol constellation, wherein one of the data symbols and the symbol constellation are normalized; and
       correct the observation metric by applying an inverse mapping function to obtain a corrected observation metric;
       estimate a data channel signal-to-interference ratio based on the corrected observation metric.

11. The communication device of claim 10 wherein said processing circuit is configured to compute said observation metric by:
    computing normalized data symbols from said received data symbols;

demodulating the received symbols to generate detected symbols; and computing a noise power estimate as an average energy of the difference between said detected symbols and said normalized data symbols.

12. The communication device of claim 11 wherein said processing circuit is configured to determine, for each received symbol, a corresponding symbol in a predetermined symbol constellation that is closest to said received normalized data symbol to demodulate said received data symbols.

13. The communication device of claim 11 wherein said processing circuit is configured to compute normalized data symbols from said received data symbols by:

computing a decision boundary scaling factor based on said received data symbols;

computing a normalization factor based on said decision boundary scaling factor; and applying said normalization factor to said received data symbols.

14. The communication device of claim 11 wherein said processing circuit is configured to compute normalized data symbols from said received data symbols by:

determining a pilot SIR from received pilot symbols;

computing a normalization factor based on said pilot SIR and a data-to-pilot power ratio; and applying said normalization factor to said received data symbols.

15. The communication device of claim 10 wherein said processing circuit is configured to compute an observation metric based on deviations of said data symbols from a predetermined set of possible data symbols by:

computing normalized data symbols from said received data symbols;

extracting soft values for one or more least significant bits of said normalized data symbols; and computing a noise power estimate as an average soft value deviation from a p-norm measure.

16. The communication device of claim 10 wherein said processing circuit is configured to compute an observation metric based on deviations of said data symbols from a predetermined set of possible data symbols by:

computing normalized data symbols from said received data symbols; and computing a count of said normalized data symbols falling outside a symbol constellation envelope.

17. The communication device of claim 10 wherein said processing circuit is further configured to transform said data channel signal-to-interference ratio to an estimated pilot channel signal-to-interference ratio.

18. The communication device of claim 17 wherein said processing circuit is configured to transform said data channel signal-to-interference ratio to an estimated pilot channel signal-to-interference ratio by determining a data-to-pilot power ratio; and scaling said data channel signal-to-interference ratio according to a said data-to-pilot power ratio.

* * * * *